(12) United States Patent
Wang et al.

(10) Patent No.: US 11,706,456 B2
(45) Date of Patent: *Jul. 18, 2023

(54) SYSTEM AND METHOD FOR CORRECTING NETWORK LOSS OF DATA

(71) Applicant: Agora Lab, Inc., Santa Clara, CA (US)

(72) Inventors: Rui Wang, Shanghai (CN); Liang Si, Shanghai (CN); Bifeng He, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,620

(22) Filed: Aug. 15, 2022

(65) Prior Publication Data

US 2023/0188755 A1 Jun. 15, 2023

Related U.S. Application Data

(63) Continuation of application No. 17/376,723, filed on Jul. 15, 2021, now Pat. No. 11,616,986.

(51) Int. Cl.
| | |
|---|---|
| *H04N 7/12* | (2006.01) |
| *H04N 19/67* | (2014.01) |
| *H04L 65/80* | (2022.01) |
| *H04N 19/89* | (2014.01) |
| *H04N 19/169* | (2014.01) |
| *H04L 65/70* | (2022.01) |

(52) U.S. Cl.
CPC ............ *H04N 19/67* (2014.11); *H04L 65/70* (2022.05); *H04L 65/80* (2013.01); *H04N 19/188* (2014.11); *H04N 19/89* (2014.11)

(58) Field of Classification Search
CPC ..................................................... H04N 19/67
See application file for complete search history.

(56) References Cited

U.S. PATENT DOCUMENTS

| | | |
|---|---|---|
| 8,428,555 B2 | 4/2013 | Kim et al. |
| 8,917,625 B2 | 12/2014 | Li et al. |
| 9,386,154 B2 | 7/2016 | Assem et al. |
| 10,574,978 B1 | 2/2020 | He |

OTHER PUBLICATIONS

Dejan V, Andrea T, Savo D, et al. Random Linear Network Coding for 5G Mobile Video Delivery[J]. Information, 2018, 9(4):72-.

(Continued)

*Primary Examiner* — Y Lee
(74) *Attorney, Agent, or Firm* — The Law Offices of Konrad Sherinian, LLC; Depeng Bi (57) ABSTRACT

A reference-order AL-FEC system for recovering network video data packet loss during real-time video communication includes a packetizer, a reference-order AL-FEC encoder, a reference-order AL-FEC decoder and a depacketizer. The packetizer constructs source symbols from source packets of a current frame. The encoder generates a repair symbol from the source symbols of the current frame and other reference frames based on the reference-order, not time-order, between the frames within an encoding window. The encoder also generates a repair packet based on the repair symbol. The decoder recovers a lost source symbol based on the source symbols of the frames of the encoding window and the repair symbol by decoding the repair packet. The decoding is achieved by solving a linear system of the repair symbol.

6 Claims, 9 Drawing Sheets

(56) References Cited

OTHER PUBLICATIONS

Xiao J, Tillo T, Zhao Y. Real-Time Video Streaming Using Randomized Expanding Reed-Solomon Code[J]. IEEE Transactions on Circuits & Systems for Video Technology, 2013, 23(11):1825-1836.
Roca V, Teibi B, Burdinat C, et al. Block or Convolutional AL-FEC Codes? A Performance Comparison for Robust Low-Latency Communications. http://hal.univ-savoie.fr/INRIA/hal-01395937, 2016.

Prior art

FIG. 1

Time

*Prior art*

FIG. 2

*Prior art*

SYSTEM AND METHOD FOR CORRECTING NETWORK LOSS OF DATA

CROSS REFERENCE TO RELATED APPLICATIONS

This application is a continuation of co-pending U.S. patent application Ser. No. 17/376,723, entitled "SYSTEM AND METHOD FOR CORRECTING NETWORK LOSS OF DATA", filed Jul. 15, 2021, assigned to Agora Lab, Inc. of Santa Clara, Calif., which is hereby incorporated by reference in its entirety.

FIELD OF THE DISCLOSURE

The present invention generally relates to real-time video communications, and more particularly relates to a system and method for correcting network loss of data during real-time video communications. More particularly still, the present disclosure relates to a reference-order AL-FEC system and method for correcting network loss of data during real-time video communications.

DESCRIPTION OF BACKGROUND

With the rapid growth of Internet based communications, such as real-time communications, real-time video streaming has become very prevalent. It is well known that more than two thirds of the data transmitted over the Internet is video data. For instance, social communication software applications, such as WeChat, WhatsApp, Facebook Messenger, and various other mobile apps are used by billions of people on a daily. The mobile apps carry out billions of video communications (such as video calls) each year. Moreover, many more mobile and IoT applications, including live video broadcasting and cloud video-gaming, continue to increase video traffic over the Internet.

However, the IP (standing for Internet Protocol) networks and wireless channels are not always reliable. When the networks are unreliable, data packet loss occurs. Taking mobile networks as an example, packet loss occurs when the received signal strength is weak and when congestion occurs at network nodes.

Video streaming data in real-time communication is more particular sensitive to data packet loss than other types of data since the conventional video encoders utilize prediction-based motion estimation and entropy coding. In addition, packet loss in one frame propagates to the subsequent video frames. The propagation leads to severe degradation of quality in the reconstructed video. Retransmission is generally used to improve transmission robustness. However, retransmission is not suitable for some situations, such as single-direction channels, channels with large round-trip-time, and multicast/broadcast video streaming, etc. In such situations, Application-Level Forward Erasure Coding (AL-FEC) is used to remedy the impact of data packet loss. AL-FEC uses redundant coded data to help recover lost packets. In other words, AL-FEC adds redundancy in order to be able to recover from erasures. Since AL-FEC does not require a feedback channel, it is sometimes suitable for multicast and broadcast applications.

Figure 1:
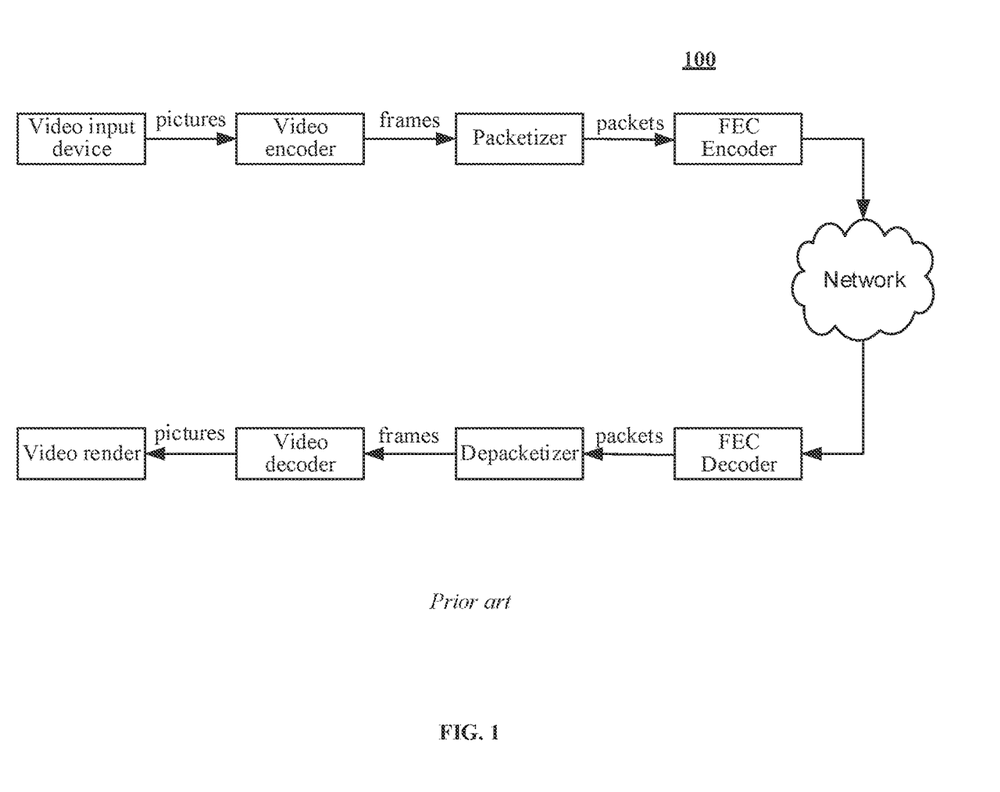
FIG. 1 is a prior art block diagram illustrating a real-time video streaming pipeline incorporating Application-Level Forward Erasure Coding.

The conventional AL-FEC is further illustrated in FIG. 1 and generally indicated at 100. A video source component, such as a camera, outputs pictures. A video encoder outputs video frames from the pictures. A packetizer generates data packets from the video frames. The packets are the input to an AL-FEC encoder. On the receiving side, an AL-FEC decoder outputs the data packets from the received data that is generated by the AL-FEC encoder and transmitted over the Internet. The depacketizer component reconstructs video frames from the decoded data packets. The video decoder component then reconstructs the pictures from the frames. The video render component then renders the pictures on a display screen of the receiving device.

One conventional AL-FEC approach for real-time video streaming applications is to perform Reed-Solomon coding at the frame level. This approach is also referred to as Block AL-FEC. For single frame FEC coding, there is no decoding delay. However, its error correction performance is low when the number of video source packets generated in each frame is small. For multi-frame FEC coding, the value of the parameter N of the Reed-Solomon code, RS(N,k), can be increased to improve error correction performance. Nonetheless, the additional decoding delay caused by the increased N is generally unacceptable for real-time video streaming applications.

To overcome the shortcomings of the block AL-FEC approach, the convolutional FEC coding has been proposed. The convolutional coding is implemented using an expanding or sliding encoding window, which includes several frames that are grouped or selected by the frame generation timestamp. The convolutional thus referred to herein as a time-order AL-FEC. The time-order AL-FEC improves error-correcting efficiency without adding extra delay. It utilizes a sliding encoding window. When a new frame is generated, the FEC encoder searches backward by frame generation timestamp to find an encoding window (also referred to herein as a coding window). However, the time-order AL-FEC is not superior or more preferrable to the Block AL-FEC in certain situations. When the Packet Loss Rate (PLR) is low, the time-order AL-FEC has certain advantages over the Block AL-FEC. However, when the PLR is high, and Scalable Video Coding (SVC) is enabled, the error correction performance of the time-order AL-FEC is significantly lower than that of the Block AL-FEC.

Figure 2:
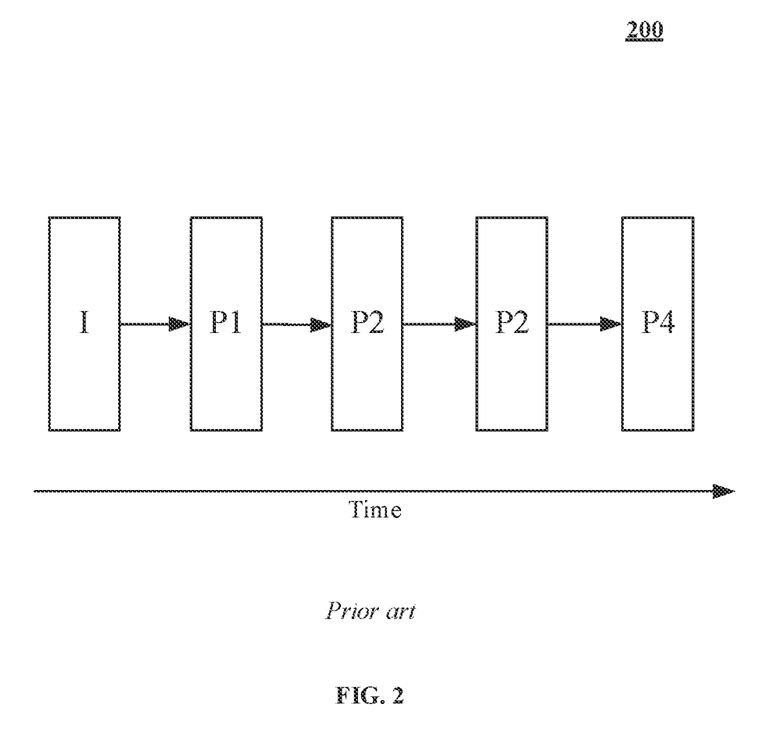
FIG. 2 is a prior art block diagram illustrating a set of timely ordered frames with frame dependency.

In non-SVC cases, a video frame is referenced by the subsequent inter frame. Accordingly, the successful decoding and rendering of an inter-frame depend on the successful decoding of the previous frame. It is further shown in FIG. 2 and generally indicated at 200. In the SVC case, the dependency between frames is not simply one-dimensional frame-by-frame in a timely order. The frames are grouped into layers, the base layer, and one or more enhancement layers. Frame in one layer may not reference the timely previous frame of the same layer.

Figure 3:
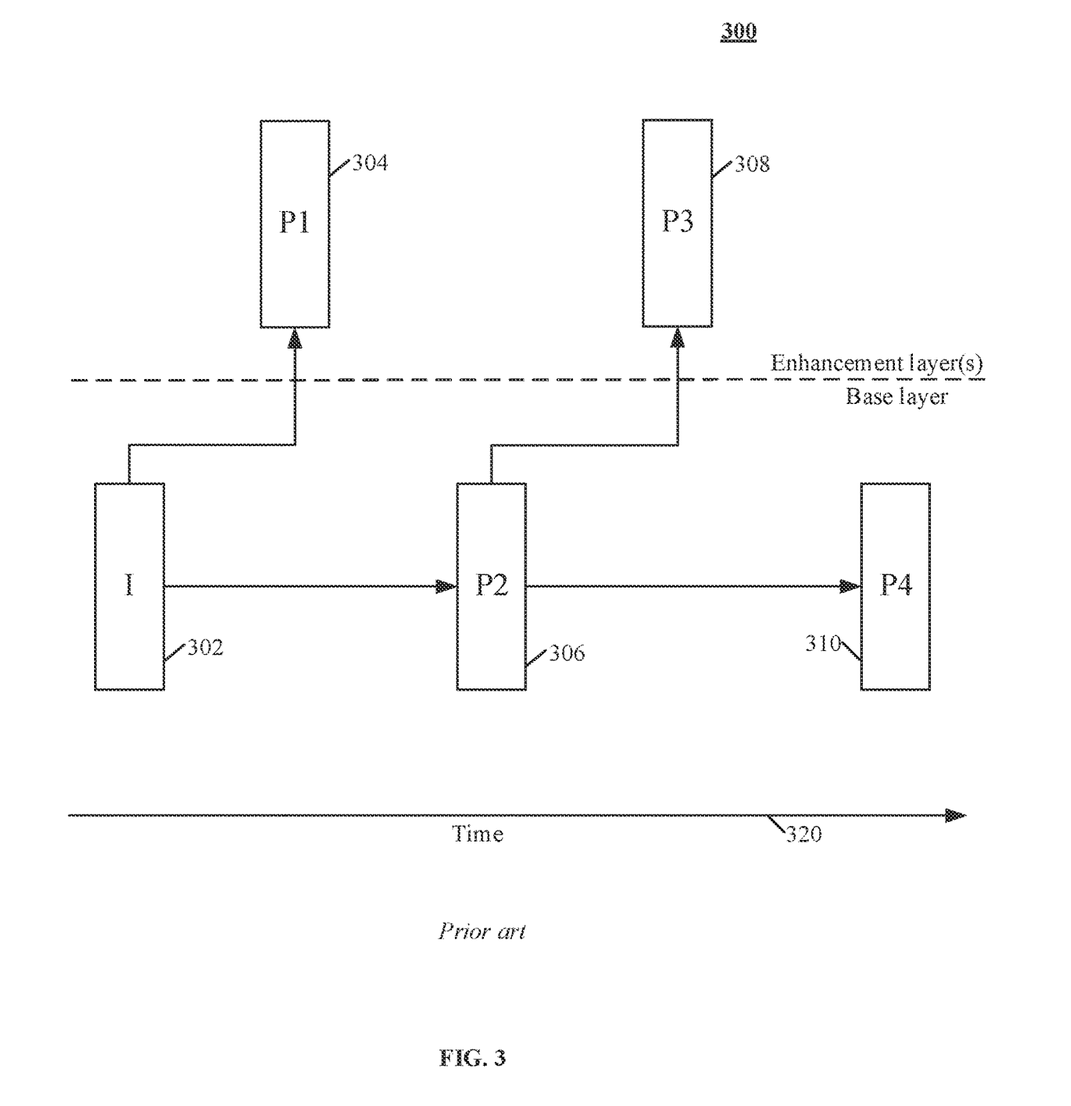
FIG. 3 is a prior art block diagram illustrating a set of timely ordered frames at different layers with frame dependency.

The lack of consideration of video encoding dependency between video frames is the reason that the time-order AL-FEC has an inferior performance in the SVC scenario, which is further illustrated in FIG. 3 and generally indicated at 300. In the order of time (meaning along the time line 320), the frames are the intra-coded picture (I-frame) 302 and predicted pictures (P-frames) 304, 306, 308 and 310. The interframes 304 and 308 are in the enhanced layer while the intra frame 302 and the interframes 306 and 310 are in the base layer. As used herein, intra frames are also referred to as I frame. The P-frame 304 references the I-frame 302; the P-frame 306 references the frame 302, but not the frame 304; the P-frame 308 references the frame 306; and the P-frame 310 references the P-frame 306, but not the interframe 308. Accordingly, there is a need for a new method and a new system that overcome the shortcomings of the time-order AL-FEC solution. The new AL-FEC solution overcomes the shortcomings of the time-order AL-FEC and the Block AL-FEC.

SUMMARY OF THE DISCLOSURE

Generally speaking, pursuant to the various embodiments, the present disclosure provides a reference-order AL-FEC system for recovering network video data packet loss during real-time video communication. The reference-order AL-FEC system includes a packetizer, a reference-order AL-FEC encoder, a reference-order AL-FEC decoder and a depacketizer. The packetizer is adapted to be run on a sender device, which includes a first processing unit, a first network interface operatively coupled to the first processing unit and a network, a first memory operatively coupled to the first processing unit, and a video input device operatively coupled to the first processing unit. The packetizer is further adapted to retrieve a current frame provided, the current frame encoded by a video encoder from a picture captured by the video input device; divide the current frame into a set of source packets; and construct a source symbol from each source packet within the set of source packets to form a set of source symbols of the current frame. Each source symbol includes a corresponding source packet, a frame descriptor and an encoding symbol identifier. The reference-order AL-FEC encoder is adapted to be run on the sender device. It is also adapted to search backward according to a reference order of the current frame to find all reference frames of the current frame within an encoding window, wherein the reference order is not a time-reference order or a block-reference order; determine a set of source symbols of each of the reference frames to form a list of sets of source symbols, the set of source symbols of the current frame and the list of sets of source symbols forming a first set of source symbols; perform FEC encoding on the first set of source symbols to generate a repair symbol; and construct a repair packet based on the repair symbol, the repair packet including the repair symbol and a repair packet descriptor, the repair packet and the first set of source symbols adapted to be sent to a receiver device over the network by the sender device. The reference-order AL-FEC decoder is adapted to be run on the receiver device, which has a second processing unit, a second network interface operatively coupled to the second processing unit, a second memory operatively coupled to the second processing unit, and a video render device operatively coupled to the second processing unit. The reference-order AL-FEC decoder is further adapted to retrieve the repair packet and a second set of source symbols sent by the sender device over the network; extract a repair packet descriptor from the repair packet; determine that a source symbol within the set of source symbols of the current frame is lost based on encoding symbol identifiers of the set of source symbols, wherein, when there is source symbol loss, the second set of source symbols differs from the first set of source symbols and, when there is no source symbol loss, the second set of source symbols is same as the first set of source symbols; and decode the repair packet to recover the lost source symbol. The depacketizer is adapted to be run on the receiver device and to construct the current frame from the second set of source symbols and the lost source symbol, wherein the reconstructed current frame is adapted to be used to construct the picture by a video decoder, and wherein the reconstructed picture is rendered by the video render device. The network can be the Internet. In one implementation, the packetizer, reference-order AL-FEC encoder, reference-order AL-FEC decoder and depacketizer are computer software components. The reference-order AL-FEC encoder is further adapted to terminates searching backward when an intra frame is found or a predetermined number of frames have been found, wherein the encoding window consists of all found frames including the current frame. In one implementation, the repair symbol is a linear system described by an equation below:

$$\text{Repair Symbol} = \sum_{y=0}^{cw\_size-1} G(x, y) * \text{Source\_y}$$

where Repair Symbol denotes the repair symbol, Source_y denotes a y-th source symbol within the encoding window, G(x,y) denotes a coding coefficient of a coding matrix, x denotes a row number of the coding matrix, y denotes a column number of the coding matrix, cw_size denotes a number of source symbols within the encoding window. In such a case, the reference-order AL-FEC decoder decodes the repair packet to recover the lost source symbol by solving the linear system.

Further in accordance with the present teachings is a method for recovering network video data packet loss during real-time video communication. The method is performed within a reference-order AL-FEC system and includes retrieving a current frame by a packetizer. The current frame is encoded by a video encoder from a picture captured by the video input device. The packetizer is adapted to be run on a sender device. The sender device has a first processing unit, a first network interface operatively coupled to the first processing unit and a network, a first memory operatively coupled to the first processing unit, and a video input device operatively coupled to the first processing unit. The method also includes dividing the current frame into a set of source packets by the packetizer; and constructing, by the packetizer, a source symbol from each source packet within the set of source packets to form a set of source symbols of the current frame. Each source symbol includes a corresponding source packet, a frame descriptor and an encoding symbol identifier. The method further includes searching, by a reference-order AL-FEC encoder, backward according to a reference order of the current frame to find all reference frames of the current frame within an encoding window. The reference-order AL-FEC encoder is adapted to be run on the sender device, wherein the reference order is not a time-reference order or a block-reference order. In addition, the method includes determining, by the reference-order AL-FEC encoder, a set of source symbols of each of the reference frames to form a list of sets of source symbols. The set of source symbols of the current frame and the list of sets of source symbols form a first set of source symbols. Moreover, the method includes performing, by the reference-order AL-FEC encoder, FEC encoding on the first set of source symbols to generate a repair symbol; and constructing, by the reference-order AL-FEC encoder, a repair packet based on the repair symbol. The repair packet includes the repair symbol and a repair packet descriptor. The repair packet and the first set of source symbols are adapted to be sent to a receiver device over the network by the sender device. The method also includes retrieving, by a reference-order AL-FEC decoder, the repair packet and a second set of source symbols sent by the sender device over the network. The reference-order AL-FEC decoder is adapted to be run on the receiver device. The receiver device has a second processing unit, a second network interface operatively coupled to the second processing unit, a second memory operatively coupled to the second processing unit, and a video render device operatively coupled to the second processing unit. The method further includes extracting, by the reference-order AL-FEC decoder, a repair packet descriptor from the repair packet; and determining, by the reference-order AL-FEC decoder, that a source symbol within the set of source symbols of the current frame is lost based on encoding symbol identifiers of the set of source symbols. Wherein, when there is source symbol loss, the second set of source symbols differs from the first set of source symbols and, and when there is no source symbol loss, the second set of source symbols is same as the first set of source symbols. In addition, the method includes decoding, by the reference-order AL-FEC decoder, the repair packet to recover the lost source symbol; and constructing, by a depacketizer adapted to be run on the receiver device. The current frame from the second set of source symbols and the lost source symbol. Wherein the reconstructed current frame is adapted to be used to construct the picture by a video decoder; and wherein the reconstructed picture is rendered by the video render device. In one implementation, the network is the Internet. In one implementation, the packetizer, reference-order AL-FEC encoder, reference-order AL-FEC decoder and depacketizer are computer software components. In one implementation, the reference-order AL-FEC encoder is further adapted to terminates searching backward when an intra frame is found or a predetermined number of frames have been found, wherein the encoding window consists of all found frames including the current frame. In one implementation, the repair symbol is a linear system described by an equation below:

$$\text{Repair Symbol} = \sum_{y=0}^{cw\_size-1} G(x, y) * \text{Source\_y}$$

where Repair Symbol denotes the repair symbol, Source_y denotes a y-th source symbol within the encoding window, G(x,y) denotes a coding coefficient of a coding matrix, x denotes a row number of the coding matrix, y denotes a column number of the coding matrix, cw_size denotes a number of source symbols within the encoding window. In one implementation, the reference-order AL-FEC decoder decodes the repair packet to recover the lost source symbol by solving the linear system.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 4:
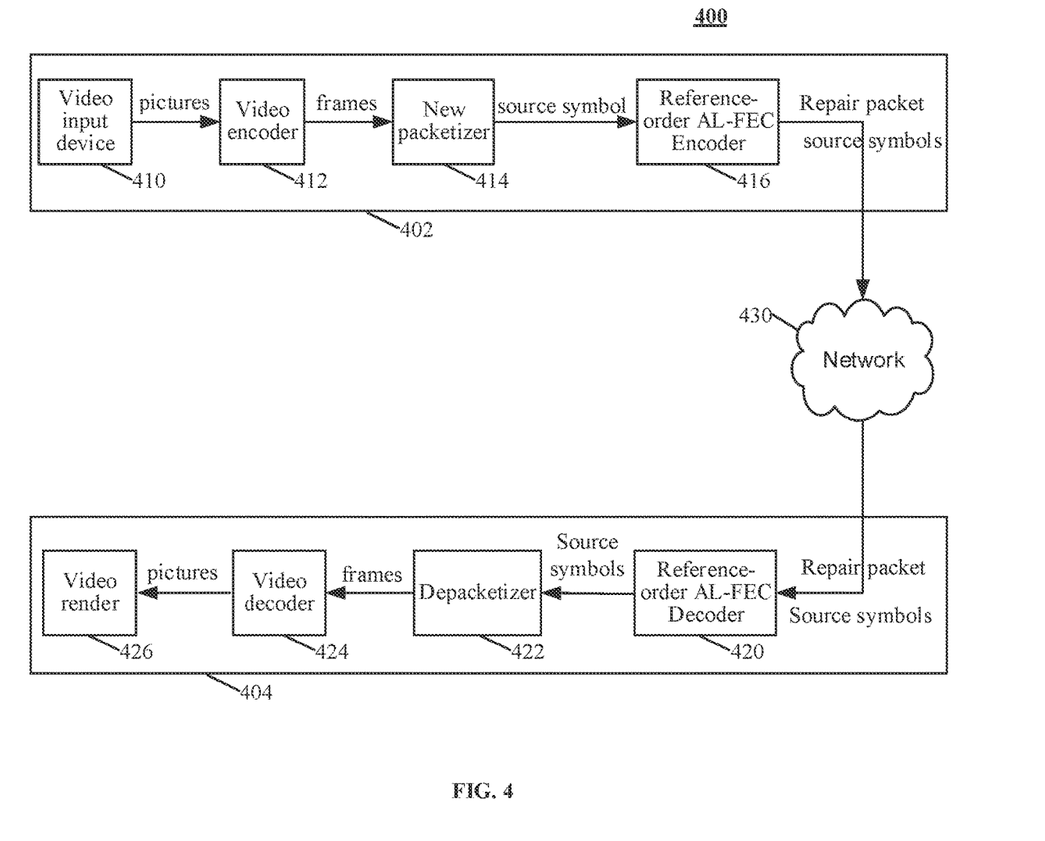
FIG. 4 is a block diagram illustrating a real-time video communication system with a reference-order AL-FEC system in accordance with this disclosure.

Turning to the Figures and to FIG. 4 in particular, a block diagram illustrating a real-time video communication system with a new reference-order AL-FEC system is shown and generally indicated at 400. The system 400 includes an electronic communication device 402 (such as a smartphone, a tablet computer, etc.) that sends data and an electronic communication device 404 (such as a smartphone, a tablet computer, etc.) that receives the data sent by the sender 402. The devices 402-404 each includes a processing unit, a network interface operatively coupled to the processing unit for accessing the network 430, and some amount of memory operatively coupled to the processing unit.

The device 404 is also referred to herein as a receiver and a receiving device, while the sender 402 is also referred to herein as a sending device and a transmitter. The video input device 410, operatively coupled to the processing unit of the device 402, captures pictures. The video encoder 412 encodes the pictures and outputs frames. The new packetizer 414 constructs source symbols from the frames. The reference-order AL-FEC encoder 416 generates repair packets. The source symbols and corresponding repair packets are sent to receiving devices, such as the receiver 404 over the network (such as the Internet) 430 using, for example, the Transmission Control Protocol (TCP) and/or the Internet Protocol (IP).

The receiver 404 receives the repair packets and the source symbols. Due to network conditions and issues, some source symbols may be lost. In such a case, the receiver 404 will not receive all the source symbols sent by the sender 402. The reference-order AL-FEC decoder 420 takes the received source symbols and repair packets as input and outputs a set of source symbols, which includes the received source symbols and recovered source symbols that were lost. The new depacketizer 422 derives the frame(s) from the source symbols output by the reference-order AL-FEC decoder 420. The video decoder 424 converts the frames into pictures, which are rendered by the video render, operatively coupled to the processing unit of the device 404, 426 on a video display screen.

In one implementation, the components 412, 414, 416, 420, 422, 424 each are implemented as computer software components. Each computer software component is one or more computer software programs written using one or more computer program languages, such as C, C++, C#, Java, etc. The components may also implemented by hardware devices.

Figure 5:
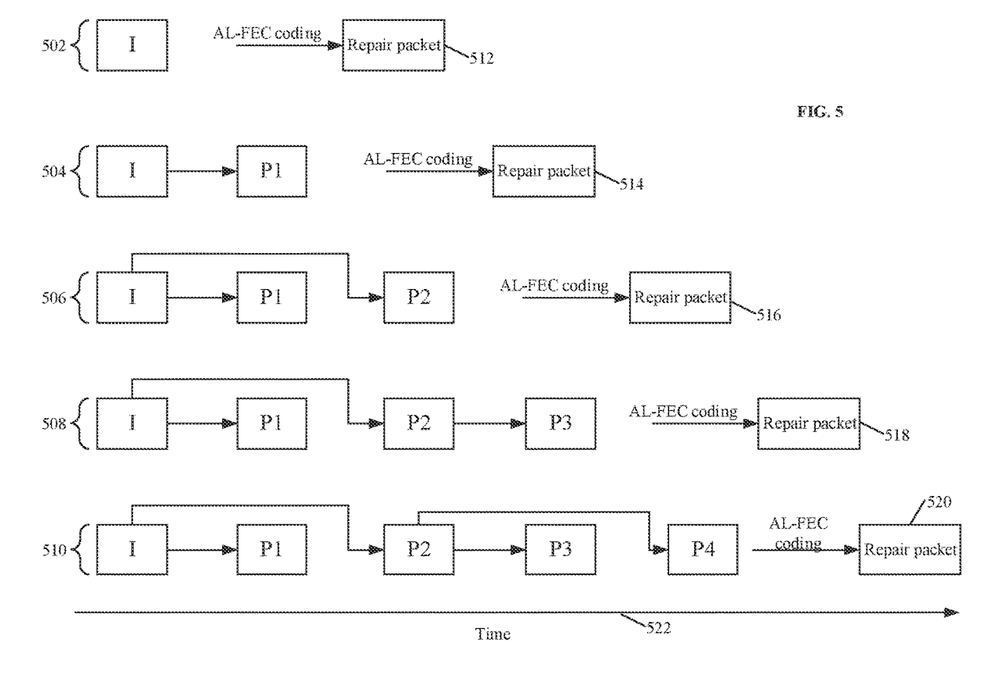
FIG. 5 is a block diagram illustrating how a reference-order AL-FEC system encodes data packets and corrects network data packet loss in accordance with this disclosure.

Referring to FIG. 5, it is a block diagram illustrating the reference-order AL-FEC system and how it supports network data loss recovery. For the scenario 502, the intra frame I and a corresponding repair packet 512 are sent to receiving devices. In the case 504, the frame P1 references the frame I. The repair packet 514 is generated based on the frames I and P1. The encoding window includes the frames I and P1.

In the case 506, the frame P1 references the frame I; and the frame P2 references the frame I, but not the frame P1. When the frame P2 is sent out (i.e., when the source symbols of the frame P2 are sent to receiving devices, such as the receiver 404), the repair packet 516 is generated based on only the source symbols of the frames I and P2, which are part of the encoding window. The frame P1 references the frame I.

In the case 508, the frame P1 references the frame I; the frame P2 references the frame I, but not the frame P1; and the frame P3 references the frame P2, but not the frame P1. When the frame P3 is sent out (i.e., when the source symbols of the frame P3 are sent to receiving devices, such as the receiver 404), the repair packet 518 is generated based on only the source symbols of the frames I, P2 and P3, which are part of the encoding window.

In the case 510, the frame P1 references the frame I; the frame P2 references the frame I, but not the frame P1; the frame P3 references the frame P2, but not the frame P1; and the frame P4 references the frame P2, but not the frame P1 or the frame P3. The sequence of the frames along the time line 522 is from the frame I to the frame P4. When the frame P4 is sent out (i.e., when the source symbols of the frame P4 are sent to receiving devices, such as the receiver 404), the repair packet 520 is generated based on only the source symbols of the frames I, P2 and P4, which are part of the encoding window, but not the source symbols of the frames P1 and P3. The repair packet 520 does not incorporate information of the frames P1 and P3.

In other words, when the frame P4 is processed, the reference-order AL-FEC encoder searches backward to find its encoding window. Instead of searching backward by frame timestamp, the new coding method searches backward by its reference order. Regarding the frame P4, the reference-order AL-FEC encoder first finds its reference frame P2, and then finds the reference frame of the frame P2, which is the frame I. The frames I, P2 and P4 are placed in the encoding window with the frames P1 and P3 skipped. In the non-SVC cases, since all frames are referenced frame-by-frame based on timestamp, the new reference-order AL-FEC systems operates in the same way as the time-order AL-FEC encoding method.

Figure 6:
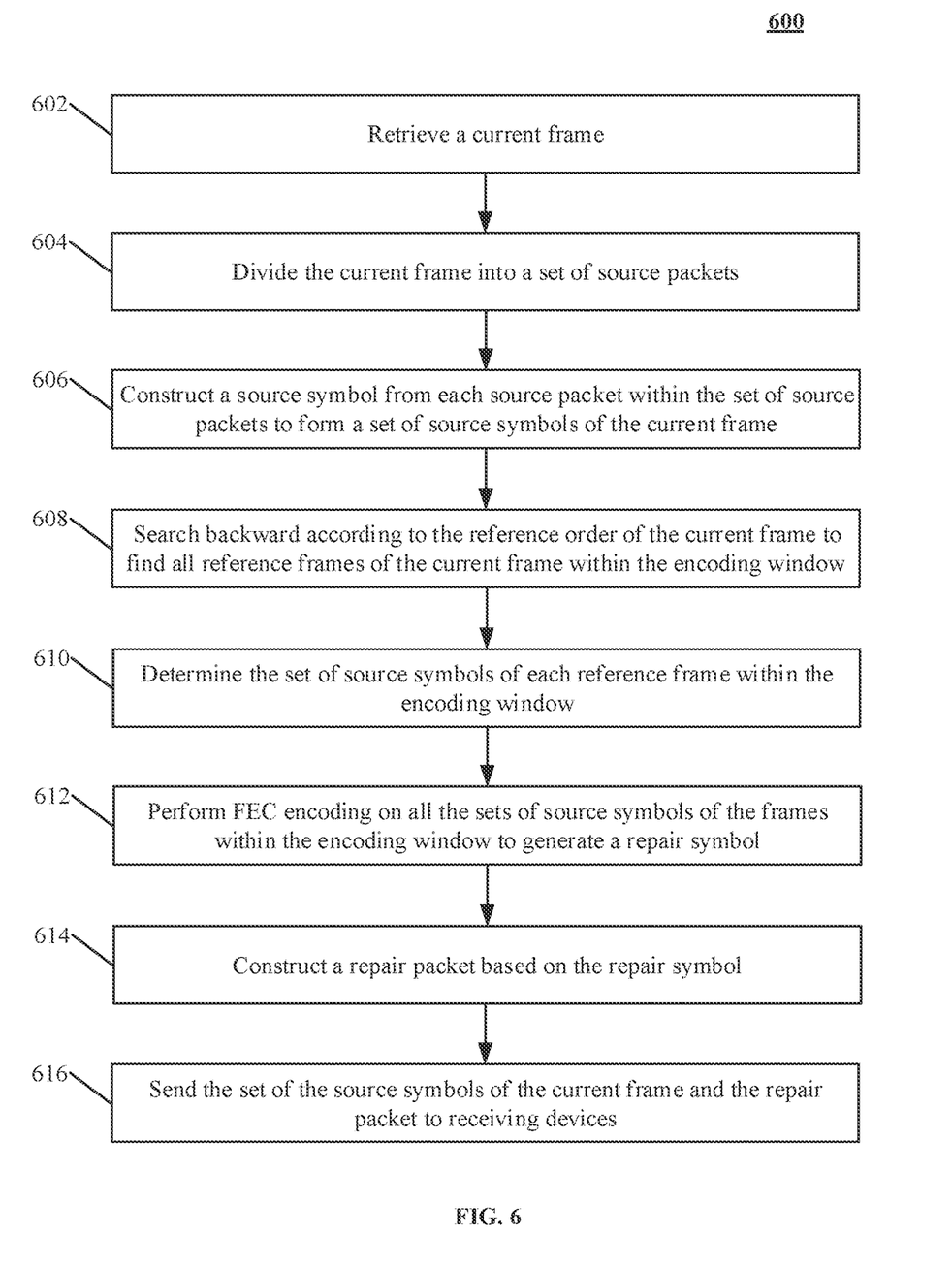
FIG. 6 is a flowchart illustrating a process by which a reference-order AL-FEC system corrects network data packet loss in accordance with this disclosure.

The process by which the reference-order AL-FEC system corrects network packet loss is further shown by reference to FIG. 6. Referring to FIG. 6, a flowchart illustrating the process is shown and generally indicated at 600. At 602, the new packetizer 414 retrieves a frame. For ease of reference, the retrieved frame is also referred to herein as a current frame. Like the packetizer of the prior art system 100, the new packetizer 414 divides the current frame into a set of source packets (also referred to herein as source data packets) at 604. Conventionally, the source packets are transmitted to receivers from senders. At 606, the new packetizer 414 constructs a source symbol from each source packet within the set of source packets to form a set of source symbols. The set of source symbols is said to be the set of source symbols of the current frame and the corresponding set of source symbols of the current frame, while the set of source packets is said to be the corresponding set of source packets of the current frame.

Figure 7:
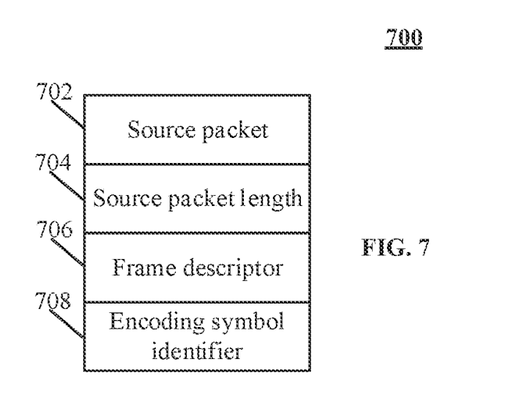
FIG. 7 is a block diagram illustrating a source symbol in accordance with this disclosure.

A source symbol, as shown in FIG. 7 and indicated at 700, includes the corresponding source packet 702, the length field 704 indicating the source packet length, a frame descriptor field 706 and an encoding symbol identifier 708. The frame descriptor 706 identifies the current frame. For example, for a source symbol corresponding to the frame P4, the frame descriptor 706 includes the frame identifier (such as an integer) of the frame P4. The encoding symbol identifier 708 is an integer number identifying the source symbol. In one implementation, the encoding symbol identifier (ESI) 708 is incremented for each new source symbol, and after reaching the maximum value, wrapped to zero.

Turning back to FIG. 6, at 608, the reference-order AL-FEC encoder 416 searches backward according to the reference order of the current frame to find all reference frames within the encoding window. Taking the frame P4 of FIG. 5 as an example, the frame P4 references the frame P2, which references the frame I. The reference order indicates the frames P4, P2 and I. The identified encoding window includes the frames I, P2 and P4. As used herein, the backward search stops when the encoding window exceeds a predetermined maximum window size, or when an intra frame has been found. The starting frame of the encoding window does not have to be an intra frame, it could start with an inter frame.

At 610, the reference-order AL-FEC encoder 416 determines the corresponding set of source symbols of each reference frame within the encoding window. These sets of source symbols can be, for example, saved in memory. At 612, the reference-order AL-FEC encoder 416 performs FEC encoding on all the sets of source symbols corresponding to the frames (such as the frames I, P2 and P4) within the encoding window to generate a repair symbol. In one implementation, the repair symbol is a linear combination of the source symbols in the encoding window and the coding coefficients of the coding matrix. The coding coefficients are linear independent. The source symbols of all the sets of source symbols are collectively referred to as the source symbols of the repair symbol.

In one implementation, the linear combination is computed according to the Equation 1 below.

$$\text{Repair Symbol} = \sum_{y=0}^{cw\_size-1} G(x, y) * \text{Source\_y}$$

where Repair Symbol denotes the repair symbol, Source_y denotes the y-th source symbol within the coding window. G(x,y) denotes the coding coefficient of the coding matrix, x denotes the row number of the coding matrix, y denotes the column number of the coding matrix, cw_size denotes the number of source symbols within the coding window.

At 614, the reference-order AL-FEC encoder 416 constructs a repair packet based on the repair symbol. The source symbols of the repair symbol are also referred to herein as the source symbols of the repair packet. The repair packet is further illustrated by reference to FIG. 8.

Figure 8:
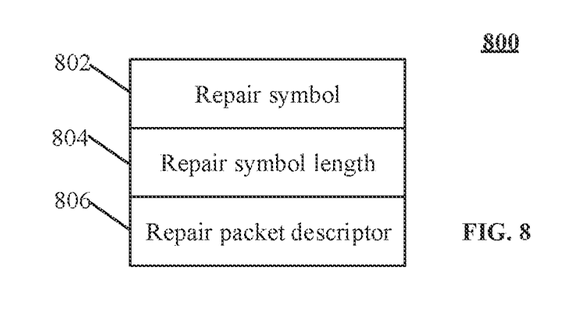
FIG. 8 is a block diagram illustrating a repair packet in accordance with this disclosure.

Referring to FIG. 8, a block diagram illustrating a repair packet is shown and generally indicated at 800. The repair packet 800 includes a repair symbol 802, a length field 804 indicating the length of the repair symbol, a repair packet descriptor 806. The repair packet descriptor 806 guides the generation of a coding matrix or vector. For example, when the coding matrix is a Cauchy matrix, the element of the coding matrix is determined based on the row number and the column number of the matrix using certain rules. In such a case, the repair packet descriptor 806 includes the row number of the coding matrix. In addition, the column number of the coding matrix is equivalent to the position of the current source symbol in the encoding window.

The repair packet descriptor 806 contains the necessary information for the decoder to obtain the coding coefficients, such as row and column information of a Cauchy matrix. It also includes a source symbol locator that is, for example, an index to all the source symbols of the repair symbol. In one implementation, the index includes three parts. The first part is the number of encoding groups. When there is a gap in the serial numbers, it is considered a new group. Each group contains one or more consecutive source symbols. The second part is the ESI of the first source symbol in each group. The third part is the number of source symbols in each group. The reference-order AL-FEC decoder 420 tracks the source symbols of the repair participating in the encoding window.

Turning back to FIG. 6, at 616, the sender sends the set of source symbols of the current frame and the repair packet to receiving devices (such as the receiver 404) over the network 430. The transmission can be performed by the encoder 416 or a different component running on the sender device 402. The repair packet 800 and the source symbols of the repair packet 800 are transmitted over the network 430 to receiving devices, such as the receiver 404. The receiver 404 then performs a decoding process on the source symbols and, when one or more source symbols are lost (meaning not received by the receiver 404), the repair packet 800 to recover the lost source symbols.

Figure 9:
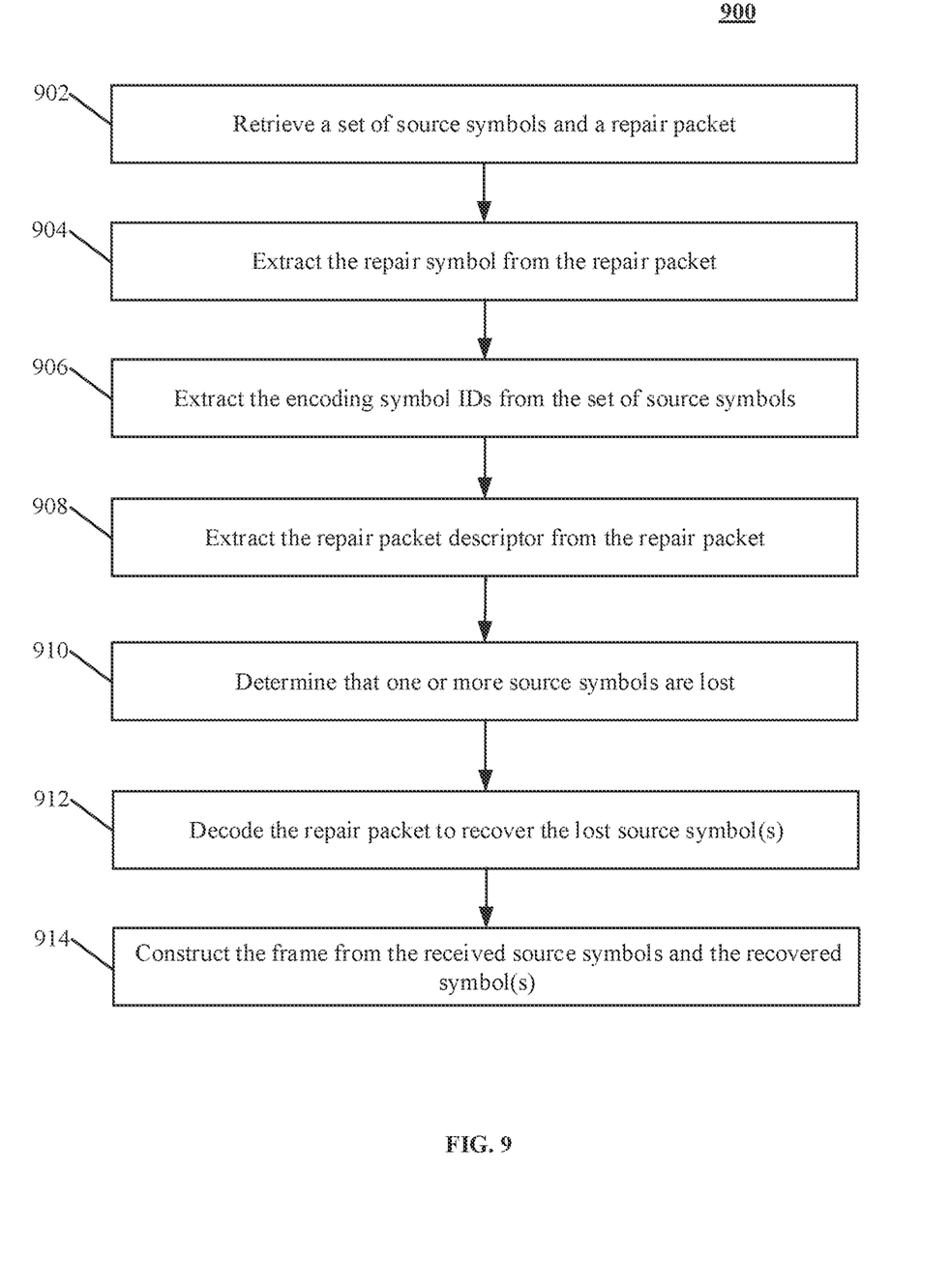
FIG. 9 is a flowchart illustrating a process by which a reference-order AL-FEC system corrects network data packet loss in accordance with this disclosure.

The decoding and recovery process is further illustrated by reference to FIG. 9. Referring now to FIG. 9, a flowchart illustrating a process by which the new reference-order AL-FEC system corrects network packet loss is shown and generally indicated at 900. The repair symbol is used to recover the lost source symbols and thus lost source packets. In one implementation, the packet descriptor 806 includes elements of the coding matrix, which are combined with the source symbols in a linear combination to form the repair symbol 802. A linear system composed of the linear combinations (such as the Equation 1 above) is maintained to recover the lost source packets.

At 902, the reference-order AL-FEC decoder 420 retrieves the repair packet and a set of source symbols sent by the sender 402. The retrieved data is received by the decoder 420 or a different component running on the receiver device 404. The received set of source symbols may be a subset of the set of source symbols sent by the sender 402 since some source symbols may be lost due to various factors, such as networking issues.

At 904, the reference-order AL-FEC decoder 420 extracts the repair symbol from the received repair packet. When the repair symbol includes a linear combination of the source symbols and the elements of the coding matrix in one implementation, the decoding involves the linear equation to recover the lost source symbol. At 906, the reference-order AL-FEC decoder 420 extracts the ESIs from the received source symbols. At 908, the reference-order AL-FEC decoder 420 extracts the repair packet descriptor from the received repair packet. A linear equation composed of the repair symbol, the corresponding source symbols, and the elements of the coding matrix is be added to the linear system in the form of Equation 1. At 910, the reference-order AL-FEC decoder 420 determines that one or more source symbols are lost. For example, when the source symbol of ESI 2045 is missing while the source symbols of ESIs 2044 and 2046 are received, the source symbol of ESI 2045 is deemed to have been lost.

At 912, the reference-order AL-FEC decoder 420 recovers the lost source symbol by decoding the repair packet. For example, in one implementation, decoding the repair packet is achieved by solving the linear system. When the number of packet loss (unknown quantity) is equal to the number of linear equations in the linear system, the linear system is solvable. At 914, the depacketizer 422 constructs one or more frames from the received source symbols and the recovered source symbols. The video decoder 424 then constructs pictures from the reconstructed frames. The video render 426 renders the reconstructed pictures. For example, the video render 426 displays and plays back the pictures on a video display screen of the receiver 404.

The reference-order AL-FEC system does not rely on a particular encoding algorithm. Coding algorithms, such as Reed-Solomon coding, Random Linear Coding, and Low-density parity-check Coding can be used with reference-order AL-FEC system. The reference-order AL-FEC implements an Unequal Error Protection (UEP) AL-FEC. Since a frame in the base layer has more chance to be referenced by other frames, the base layer frames have a bigger chance to be recovered when lost. The reference-order AL-FEC system includes the new packetizer 414, the reference-order AL-FEC encoder 416, the reference-order AL-FEC decoder 420 and the depacketizer 422.

Figure 10:
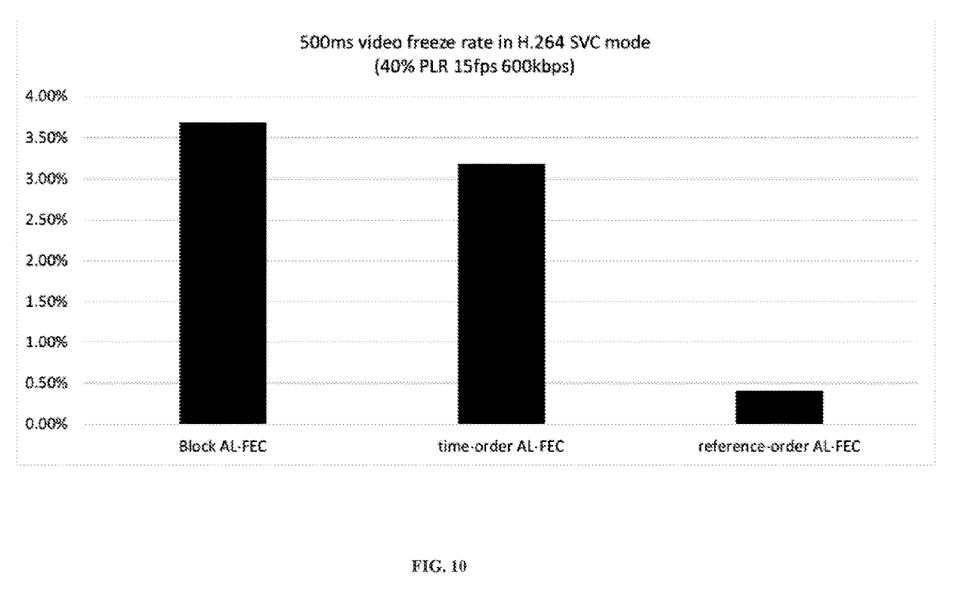
FIG. 10 is a chart illustrating the superior performance of the new reference-order AL-FEC in accordance with this disclosure.

The reference-order AL-FEC system is superior to the traditional time-order AL-FEC and Block AL-FEC methods in SVC cases. With a 500 ms video freeze rate, when PLR is 40% or more, the new reference-order AL-FEC method has a much lower video freeze rate. When the PLR is less than 40%, the reference-order AL-FEC system performs the same as the time-order AL-FEC system. In non-SVC circumstances, the reference-order AL-FEC system performs the same as the time-order AL-FEC system. One testing result is shown in FIG. 10.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for recovering network video data packet loss during real-time video communication, said method performed within a reference-order AL-FEC system and comprising:
   1) retrieving a current frame by a packetizer, said current frame encoded by a video encoder from a picture captured by said video input device, said packetizer adapted to be run on a sender device, said sender device having a first processing unit, a first network interface operatively coupled to said first processing unit and a network, a first memory operatively coupled to said first processing unit, and a video input device operatively coupled to said first processing unit;
   2) dividing said current frame into a set of source packets by said packetizer;
   3) constructing, by said packetizer, a source symbol from each source packet within said set of source packets to form a set of source symbols of said current frame, each source symbol including a corresponding source packet, a frame descriptor and an encoding symbol identifier;
   4) searching, by a reference-order AL-FEC encoder, backward according to a reference order of said current frame to find all reference frames of said current frame within an encoding window, said reference-order AL-FEC encoder adapted to be run on said sender device, wherein said reference order is not a time-reference order or a block-reference order;
   5) determining, by said reference-order AL-FEC encoder, a set of source symbols of each of said reference frames to form a list of sets of source symbols, said set of source symbols of said current frame and said list of sets of source symbols forming a first set of source symbols;
   6) performing, by said reference-order AL-FEC encoder, FEC encoding on said first set of source symbols to generate a repair symbol;
   7) constructing, by said reference-order AL-FEC encoder, a repair packet based on said repair symbol, said repair packet including said repair symbol and a repair packet descriptor, said repair packet and said first set of source symbols adapted to be sent to a receiver device over said network by said sender device;
   8) retrieving, by a reference-order AL-FEC decoder, said repair packet and a second set of source symbols sent by said sender device over said network, said reference-order AL-FEC decoder adapted to be run on said receiver device, said receiver device having a second processing unit, a second network interface operatively coupled to said second processing unit, a second memory operatively coupled to said second processing unit, and a video render device operatively coupled to said second processing unit;
   9) extracting, by said reference-order AL-FEC decoder, a repair packet descriptor from said repair packet;
   10) determining, by said reference-order AL-FEC decoder, that a source symbol within said set of source symbols of said current frame is lost based on encoding symbol identifiers of said set of source symbols, wherein, when there is source symbol loss, said second set of source symbols differs from said first set of source symbols and, when there is no source symbol loss, said second set of source symbols is same as said first set of source symbols;
   11) decoding, by said reference-order AL-FEC decoder, said repair packet to recover said lost source symbol; and
   12) constructing, by a depacketizer adapted to be run on said receiver device, said current frame from said second set of source symbols and said lost source symbol, wherein said reconstructed current frame is adapted to be used to construct said picture by a video decoder, and wherein said reconstructed picture is rendered by said video render device.

2. The method for recovering network video data packet loss during real-time video communication of claim 1 wherein said network is the Internet.

3. The method for recovering network video data packet loss during real-time video communication of claim 2 wherein said packetizer, reference-order AL-FEC encoder, reference-order AL-FEC decoder and depacketizer are computer software components.

4. The method for recovering network video data packet loss during real-time video communication of claim 3 wherein said reference-order AL-FEC encoder is further adapted to terminates searching backward when an intra frame is found or a predetermined number of frames have been found, wherein said encoding window consists of all found frames including said current frame.

5. The method for recovering network video data packet loss during real-time video communication of claim 4 wherein said repair symbol is a linear system described by an equation below:

$$\text{Repair Symbol} = \sum_{y=0}^{cw\_size-1} G(x, y) * \text{Source\_y}$$

where Repair Symbol denotes said repair symbol, Source_y denotes a y-th source symbol within said encoding window, G(x,y) denotes a coding coefficient of a coding matrix, x denotes a row number of said coding matrix, y denotes a column number of said coding matrix, cw_size denotes a number of source symbols within said encoding window.

6. The method for recovering network video data packet loss during real-time video communication of claim 5 wherein said reference-order AL-FEC decoder decodes said repair packet to recover said lost source symbol by solving said linear system.

* * * * *